United States Patent
Iqbal et al.

(10) Patent No.: US 7,962,431 B2
(45) Date of Patent: Jun. 14, 2011

(54) AUTOMATICALLY CONTROLLING IN-PROCESS SOFTWARE DISTRIBUTIONS THROUGH TIME PREDICTION OF A DISTURBANCE

(75) Inventors: Mickey Iqbal, Tucker, GA (US); Syed Babar Irfan, Austin, TX (US); Frances Fang Wand, Corning, NY (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 11/856,781

(22) Filed: Sep. 18, 2007

(65) Prior Publication Data

US 2009/0076990 A1  Mar. 19, 2009

(51) Int. Cl.
G06F 15/18 (2006.01)
(52) U.S. Cl. .......................................................... 706/46
(58) Field of Classification Search .................... 706/21, 706/46–48; 702/2, 3, 5; 717/149
See application file for complete search history.

(56) References Cited

U.S. PATENT DOCUMENTS

| | | | |
|---|---|---|---|
| 5,077,696 A | 12/1991 | McEachern et al. | |
| 5,555,518 A | 9/1996 | Whalen et al. | |
| 6,647,716 B2 | 11/2003 | Boyd | |
| 6,666,024 B1 | 12/2003 | Moskal | |
| 2004/0184350 A1 | 9/2004 | Brumley et al. | |
| 2006/0195263 A1* | 8/2006 | Meinig et al. | 702/3 |

OTHER PUBLICATIONS

Cox et al.; Coastal Wave Prediction for Cape Canaveral, Florida; 3rd Conference on Coastal Atmospheric and Oceanographic Prediction and Processes, Nov. 3-5, 1999, New Orleans; 5 Pages.

* cited by examiner

*Primary Examiner* — Donald Sparks
*Assistant Examiner* — Ola Olude-Afolabi
(74) *Attorney, Agent, or Firm* — Schmeiser, Olsen & Watts; Arthur J. Samodovitz

(57) ABSTRACT

A method and system for controlling an in-process software distribution to computing devices. A time of a disturbance in an environment of a computing device is predicted based on a change in a pressure exerted on the computing device. A checkpoint in a time interval of a distribution of a set of software upgrade increments to the computing device is automatically determined. The checkpoint is prior to the time of the disturbance. The determination of the checkpoint utilizes length(s) of increment(s) of the set of increments. Prior to the checkpoint, the computing device receives the increment(s). The computing device requests an interruption of the distribution beginning at the checkpoint. In one embodiment, the computing device is a buoy-like energy capture and generation device.

20 Claims, 7 Drawing Sheets

| SOFTWARE DISTRIBUTION DATA | DESCRIPTION |
|---|---|
| $P$ | PRESSURE THRESHOLD LEVEL FOR THE ENTIRE BUOY-LIKE ENERGY CAPTURE AND GENERATION DEVICE TO SHUT DOWN |
| $P_1, P_2, \ldots P_n$ | A TREND OF PRESSURE READINGS AT VARIOUS TIME POINTS UNDER SIMILAR ENVIRONMENTAL CONDITIONS |
| $N$ | LIKELIHOOD THRESHOLD. ONCE THE LIKELIHOOD VALUE EXCEEDS THIS THRESHOLD, AN INTERRUPTION OF THE SOFTWARE DISTRIBUTION IS ANTICIPATED |
| $T_{avg}$ | AVERAGE TIME TAKEN UNDER THE GIVEN CONDITIONS FOR PRESSURE TO CHANGE PER DEVICE |
| $N_{inc}$ | AVERAGE NUMBER OF INCREMENTS FOR COMMON TYPES OF SOFTWARE PACKAGES |
| $S_{inc}$ | AVERAGE SIZE OF INCREMENTS OF A GIVEN SOFTWARE PACKAGE |
| $BW_{avg}$ | AVERAGE NETWORK BANDWIDTH AVAILABLE |
| $n$ | NUMBER OF INCREMENTS FOR A GIVEN SOFTWARE PACKAGE |
| $n_1, n_2, \ldots n_n$ | THE SIZES OF A SERIES OF INCREMENTS OF A GIVEN SOFTWARE PACKAGE |
| $W_1, W_2, \ldots W_n$ | THE WAVE LENGTHS OF A SERIES OF WAVES AT GIVEN TIME POINTS |
| $A_1, A_2, \ldots A_n$ | THE WAVE AMPLITUDES OF A SERIES OF WAVES AT GIVEN TIME POINTS |

Pressure(t) = $f(P_1, P_2, \ldots P_n, N, T_{avg}, S_{inc}, BW_{avg}, P, A_1, A_2, \ldots A_n, W_1, W_2, \ldots W_n)$

600

Increment(t) = $f(S_{inc}, BW_{avg}, P, n, n_1, n_2, \ldots n_n)$

AUTOMATICALLY CONTROLLING IN-PROCESS SOFTWARE DISTRIBUTIONS THROUGH TIME PREDICTION OF A DISTURBANCE

FIELD OF THE INVENTION

The present invention relates to an artificial intelligence-based method and system for controlling an in-process software distribution to computing devices via automatic checkpointing in response to a prediction of an environmental disturbance to which the computing devices are subjected. More particularly, the present invention relates to a software distribution and pressure sensor system and related method for automatically checkpointing a software distribution to a buoy-like energy capture and generation device in response to a prediction of a disruptive ocean wave.

BACKGROUND OF THE INVENTION

One alternate energy generation technology is the utilization of ocean wave energy to generate and distribute power for commercial use. Wave energy generation fields that are in place in several ocean locations are comprised of buoy-like energy capture and generation devices (a.k.a. buoy-like devices) that are deployed offshore. For example, the buoy-like devices are deployed about a mile offshore over approximately 30 acres of the ocean's surface. The rising and falling of the ocean waves move each buoy-like device in a wave energy field, thereby creating mechanical energy, which is then converted into electricity. The buoy-like devices have onboard computers or control units to facilitate the capture and generation of electricity that is harnessed from each wave. The buoy-like devices are programmed to shut down in order to protect themselves when the ocean waves go beyond a predetermined height. To upgrade or install new software code (e.g., install new security patches) on the onboard computers or control units, conventional software distribution techniques can be used to distribute the software to the buoy-like devices. Under the volatile conditions of the ocean environment (e.g., waves going beyond the aforementioned predetermined height), such software distribution is interrupted, leading one or more onboard computers and/or control units to fail, come out of their maintenance modes, or have operation complications such being out of sync with other buoy-like devices in the same wave energy generation field. Other conventional techniques for upgrading the onboard computers or control units include transporting personnel offshore to the wave energy generation field to manually perform software updates on each device or to physically bring the devices or components of the devices back to shore for manual software maintenance. Such known, manual software upgrade techniques that rely on offshore transportation of personnel are time-consuming, labor-intensive, and expensive. Furthermore, these manual software upgrade techniques are based on human intervention and are therefore inconsistently applied across multiple buoy-like devices. Similar problems of operational failure, lack of synchronization, time and labor costs of manual retrieval of components and/or inconsistently applied software upgrades also pertain to software maintenance of computing devices residing in other volatile environments (e.g., probes in lava fields). Thus, there exists a need to overcome at least one of the preceding deficiencies and limitations of the related art.

SUMMARY OF THE INVENTION

The present invention provides a computer-implemented method of controlling an in-process software distribution to computing devices. A computing device predicts a time of a disturbance in an environment of the computing device. The prediction of the time of the disturbance is based on a change in a pressure exerted on the computing device. The computing device automatically determines a checkpoint in a time interval of a distribution of software upgrade increments to the computing device. The checkpoint is prior to the predicted time of the disturbance. The automatic determination of the checkpoint includes a utilization of length(s) of increment(s) of the software upgrade increments. Prior to the checkpoint, the computing device receives the increment(s). The computing device requests an interruption of the distribution. The requested interruption begins at the checkpoint in response to the request. In one embodiment, the computing device is a buoy-like energy capture and generation device.

A system and computer program product corresponding to the above-summarized method are also described and claimed herein.

Advantageously, the present invention provides a scalable, reliable, consistent, flexible and effective software maintenance technique for computer devices included in buoy-like energy capture and generation devices or any other devices that are sensitive to the changing of pressure or other environmental variables. Further, the present invention provides a technique for quickly and efficiently installing security software patches on networked buoy-like energy capture and generation devices to protect the network from intrusions. Still further, the software distribution control process disclosed herein provides software distribution to buoy-like devices while avoiding certain destructive effects of outages caused by disruptive ocean waves.

BRIEF DESCRIPTION OF THE DRAWINGS

FIG. 4 is a table describing examples of data stored in a database included in the system of FIG. 1, in accordance with embodiments of the present invention.

DETAILED DESCRIPTION OF THE INVENTION

1 Overview

The present invention provides a method and system for controlling an in-process software distribution to computing devices located in an environment in which environmental disturbances cause protective shutdowns of the computing devices. The method and system disclosed herein automatically determine a checkpoint and interrupt the software distribution at the checkpoint in response to a prediction of an environmental disturbance. The checkpoint is determined so that at least one software upgrade increment can be successfully distributed prior to the time of predicted environmental disturbance. The prediction of the environmental disturbance is based on changes in pressure exerted on the computing devices or on changes in other environmental variables associated with the computing devices. In one embodiment, the computing devices are buoy-like energy capture and generation devices (a.k.a. buoy-like devices) located in an ocean and the predicted environmental disturbance is an ocean wave having predetermined characteristics that cause a shutdown of the buoy-like devices.

2 Software Distribution System

Figure 1:
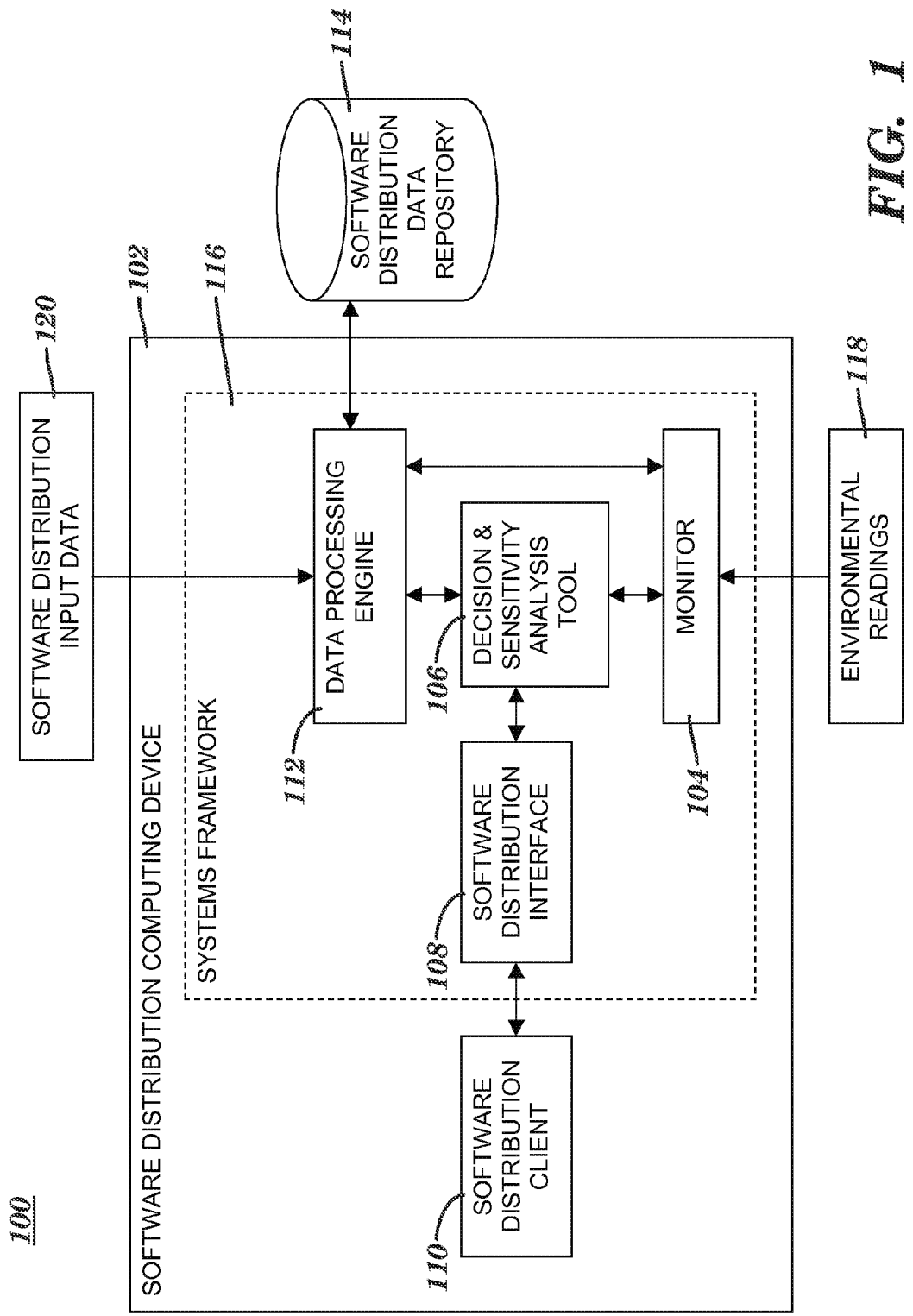
FIG. 1 is a block diagram of a system for controlling an in-process software distribution to computing devices via automatic checkpointing in response to a prediction of an environmental disturbance to which the computing devices are subjected, in accordance with embodiments of the present invention.

FIG. 1 is a block diagram of a system for controlling an in-process software distribution to computing devices via automatic checkpointing in response to a prediction of an environmental disturbance to which the computing devices are subjected, in accordance with embodiments of the present invention. System 100 includes a software distribution computing device 102, which includes a monitor 104, a decision and sensitivity analysis tool 106, a software distribution interface 108, a software distribution client 110 and a data processing engine 112, which is coupled to a software distribution data repository 114 (e.g., a database). Computing device 102 also includes a systems framework component 116.

2.1 Monitor Component

Monitor 104 monitors the conditions of the environment of computing device 102 by receiving environmental readings 118 of environmental variables. The environmental variables are used by decision and sensitivity analysis tool 106 to determine (1) whether a stop and restart of a software distribution and upgrade process is needed and (2) when to stop and restart the software distribution and upgrade process. The software distribution and upgrade process is also referred to herein simply as the software distribution process or the software distribution. Monitor 104 also sends environmental readings 118 to data processing engine 112, which stores the environmental readings in repository 114 as a historical reference.

In one embodiment, computing device 102 is a buoy-like energy capture and generation device included in a plurality of buoy-like energy capture and generation devices placed in a wave energy generation field in an ocean environment. Monitor 104, when included in a buoy-like device, receives, for example, readings 118 for any combination of variables in the following non-exhaustive list that is provided for illustrative purposes only:

1. pressure exerted by the ocean water and the atmosphere (including gusting wind pressure) on the buoy-like device
2. temperature of the water on which the buoy-like device floats
3. temperature of the air around the buoy-like device
4. wave frequency of the ocean waves moving the buoy-like device
5. wave amplitude of the ocean waves moving the buoy-like device
6. wavelengths of the ocean waves moving the buoy-like device
7. historical climate data and historical ocean wave-related data (e.g., frequency, amplitude, and wavelength)
8. size of a specific software package being distributed to the buoy-like device
9. number of buoy-like devices that need a specific software distribution package Hereinafter, items numbered 1 through 7 in the list presented above are also referred to as environmental variables and items 8 and 9 are also referred to as characteristics of a software package.

2.2 Decision and Sensitivity Analysis Tool

Decision and sensitivity analysis tool 106 processes input environmental readings 118 received from monitor 104 and characteristics of the software being updated from software distribution interface 108 against data and rules obtained from data processing engine 112 to determine if and when the software distribution process needs to stop and restart. Decision and sensitivity analysis tool 106 is a computer-based software program, which interacts with each component within systems framework 116, and uses an intelligent algorithm to determine if and when the software distribution of the upgrade can or cannot continue, based on an analysis of historical pressure data residing in software distribution data repository 114, current pressure readings included in readings 118, other environmental variables listed and discussed above relative to the monitor component 104, and characteristics of the software being upgraded.

When decision and sensitivity analysis tool 106 receives input from software distribution interface 108 indicating that a software distribution process is ready to start or is already in progress, tool 106 maps current readings 118 of the environmental variables (e.g., pressure readings) from monitor 104 against the data and trend information stored in repository 114 and accessed via data processing engine 112 to determine if there is any anticipated interruption of the software distribution process in the near future (i.e., within a time period during which the software distribution process is able to complete gracefully). Such an interruption is anticipated if tool 106 predicts the occurrence of an environmental disturbance in the near future which would cause a protective shutdown of the computing device 102. In one embodiment, an environmental disturbance is a disruptive ocean wave caused by, for instance, a storm. As used herein, a disruptive ocean wave (a.k.a., disruptive wave) is an ocean wave that has an amplitude exceeding a predefined threshold and that causes a protective shutdown of a buoy-like device that includes computing device 102.

If the aforementioned anticipated interruption is determined, tool 106 determines the stopping point of the software distribution process based on the length of the increments of software code being distributed and the amount of time available prior to the anticipated interruption. This amount of time is determined by tool 106 based on a trend generated from the historical data in repository 114 collected under similar environmental conditions. Tool 106 then sends a request to software distribution client 110 via software distribution interface 108 to stop the software distribution or upgrade at the determined stopping point.

In response to monitor 104 detecting readings 118 that have returned to normal after the environmental disturbance has passed, tool 106 evaluates if there is any other anticipated interruption in the near future. For example, after a first disruptive wave passes and pressure readings return to normal (i.e., return to a predefined operational range), tool 106 determines if pressure readings 118 indicate that another disruptive wave is predicted in the near future. If there is sufficient time to allow the next increment or increments of the software distribution or upgrade process to complete before the next environmental disturbance, tool 106 sends a resume request (i.e., a request to restart the software distribution or upgrade process) to software distribution client 110 via software distribution interface 108.

2.3 Software Distribution Interface

Software distribution interface 108 interfaces with software distribution client 110 to collect information regarding the characteristics of the software being updated by the software distribution and deliver a decision from tool 106 to client 110 regarding which increment will be the last increment processed prior to stopping the software distribution process if necessary. Software distribution client 110 resides on, for example, the buoy-like device. Interface 108 includes, for example, a set of application programming interfaces (APIs) which reads the characteristics of the software being updated via a software distribution tool such as Tivoli Provisioning Manager (TPM) Express for Software Distribution. TPM Express for Software Distribution is offered by International Business Machines Corporation located in Armonk, N.Y.

For example, client 110 is a TPM Express for Software Distribution agent that stops the distribution of a software package gracefully at the requested increment upon receiving the request from software distribution interface 108. Upon tool 106 determining that pressure readings 118 are within the predefined operational range to allow the distribution to complete its next increment, tool 106 sends a resume request to the agent via interface 108. The agent continues the software distribution process from where the software distribution process left off (i.e., at the previously determined stopping point), completes the download of the software upgrade, and commits the changes gracefully.

2.4 Management Database Component

Data processing engine 112 and repository 114 comprise a management database component that provides an integrated knowledge repository which stores facts, rules and data pertaining to a software distribution knowledge domain, location-specific ocean wave pressure forecasting, and historical measurement data for the operating environment of computing device 102. Data processing engine 112 performs data management operations on the data stored in repository 114 to generate trends of environmental disturbances (e.g., storms and disruptive waves), which tend to shut down computing devices 102, thereby causing interruptions in software distributions.

Software distribution input data 120 is input into data processing engine 112 and stored in repository 114 by, for example, one or more users (e.g., an engineering team) using a graphical user interface such as a web thin client or by a scheduled update via an automated batch process. Data 120 includes, for example, a pressure threshold level that indicates that device 102 will shut down, a threshold probability level that indicates that a software distribution interruption will occur, and historical ocean wave data for the area local to device 102. Additional details about data stored in repository 114 are presented below in Section 4.

2.5 Systems Framework Component

Systems framework 116 is a software component that binds together monitor 104, tool 106, interface 108 and data processing engine 112 and ensures that these components of device 102 work together in complete synergy within the framework as well as with components external to the framework. Systems framework 116 runs on any conventional operating system (OS) and in any computer hardware environment. In one embodiment, systems framework 116 supports National Language Support (NLS), and hence can be run in any language covered under the NLS support umbrella. Systems framework 116 may be implemented in a programming language, such as Java®, to provide multi-OS and multi-hardware support, distributed objects, and multi-language support. Framework 116 provides controlled and secure program interfaces between the components it includes and the external system environment.

Figure 2:
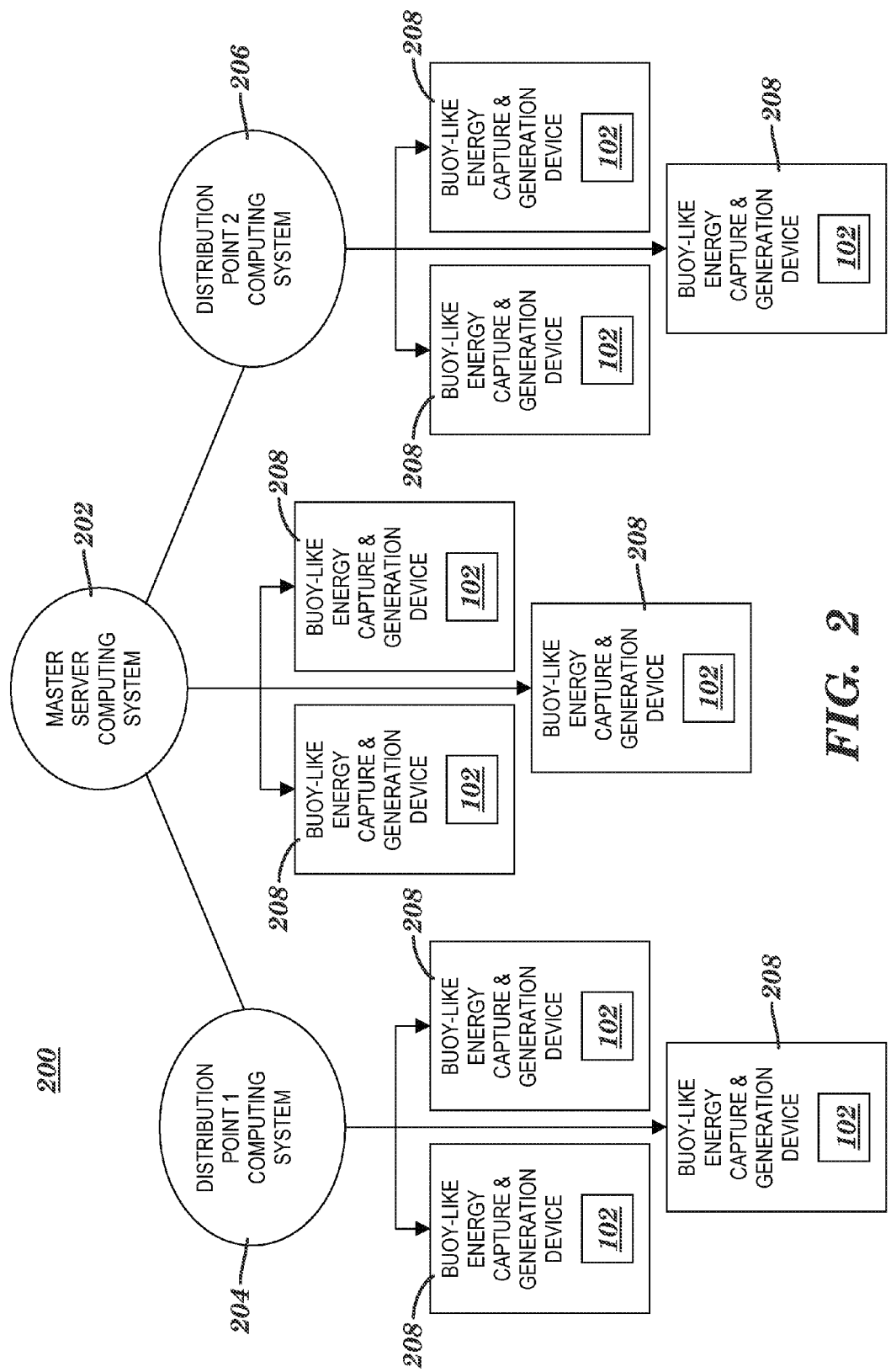
FIG. 2 is a block diagram of a software distribution server-client environment that employs the system of FIG. 1 in multiple buoy-like energy capture and generation devices, in accordance with embodiments of the present invention.

FIG. 2 is a block diagram of a software distribution server-client environment 200 that employs the system of FIG. 1 in multiple buoy-like energy capture and generation devices, in accordance with embodiments of the present invention. In one embodiment, environment 200 includes a master server computing system 202 (e.g., a TPM Express management server) and multiple distribution point computing systems (e.g., distribution point 1 computing system 204 and distribution point 2 computing system 206) in communication via wireless network with each other and with multiple buoy-like energy capture and generation devices 208. Computing systems 204 and 206 are, for example, TPM Express Distribution Point servers. Each distribution point computing system is preferably placed closer to buoy-like devices 208 than the distance from master server computing system 202 to buoy-like devices 208.

The software packages to be distributed to devices 208 are completed on master server computing system 202 and are placed in a central repository (not shown) residing on master computing system 202. The central repository also includes code for installing the software packages. The software packages are then replicated onto each distribution point computing system 204, 206. Distribution point computing systems 204, 206 can be exact replicas of master server computing system 202 or can include a subset of the software packages based on the location of specific software needs. The software packages at the distribution point computing systems 204, 206 are distributed to the buoy-like devices 208 that are coupled thereto. Each distribution point computing system (e.g., computing system 204 or 206) may directly distribute the software packages to a set of one or more buoy-like devices 208. Master server computing device 202 also has the option of directly distributing the software packages to one or more buoy-like devices 208. Alternatively, a distribution point computing system 204 may distribute the software packages to one buoy-like device 208 of a set of peer-to-peer enabled buoy-like devices, where the one buoy-like device then distributes the software packages to the other buoy-like devices in the set.

The software distribution computing device 102 (see also FIG. 1) resides on each buoy-like device 208 and includes an interface with the client code of software distribution client 110 (see FIG. 1) (e.g., a TPM client). Again, software distribution computing device 102 includes an interface to receive readings 118 (see FIG. 1) of environmental variables that device 102 monitors, and device 102 allows users (e.g., an engineering team) to update data and rules that are stored in software distribution data repository 114 (see FIG. 1).

3 Software Distribution Process

Figure 3A:
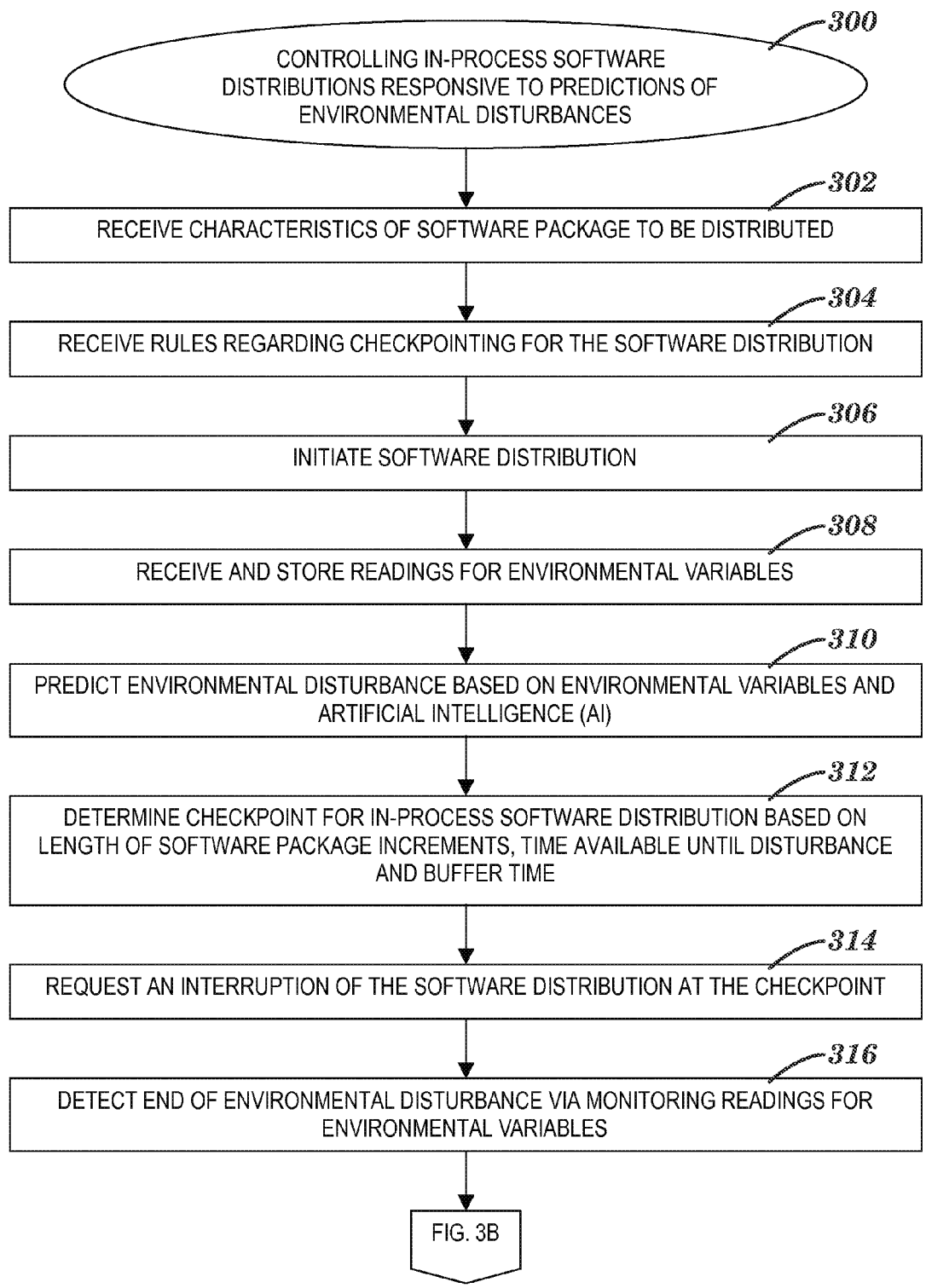
FIGS. 3A-3B depict a flow diagram of a process of controlling an in-process software distribution to computing devices via automatic checkpointing in response to a prediction of an environmental disturbance to which the computing devices are subjected, where the process is implemented by the system of FIG. 1, in accordance with embodiments of the present invention.
Figure 3B:
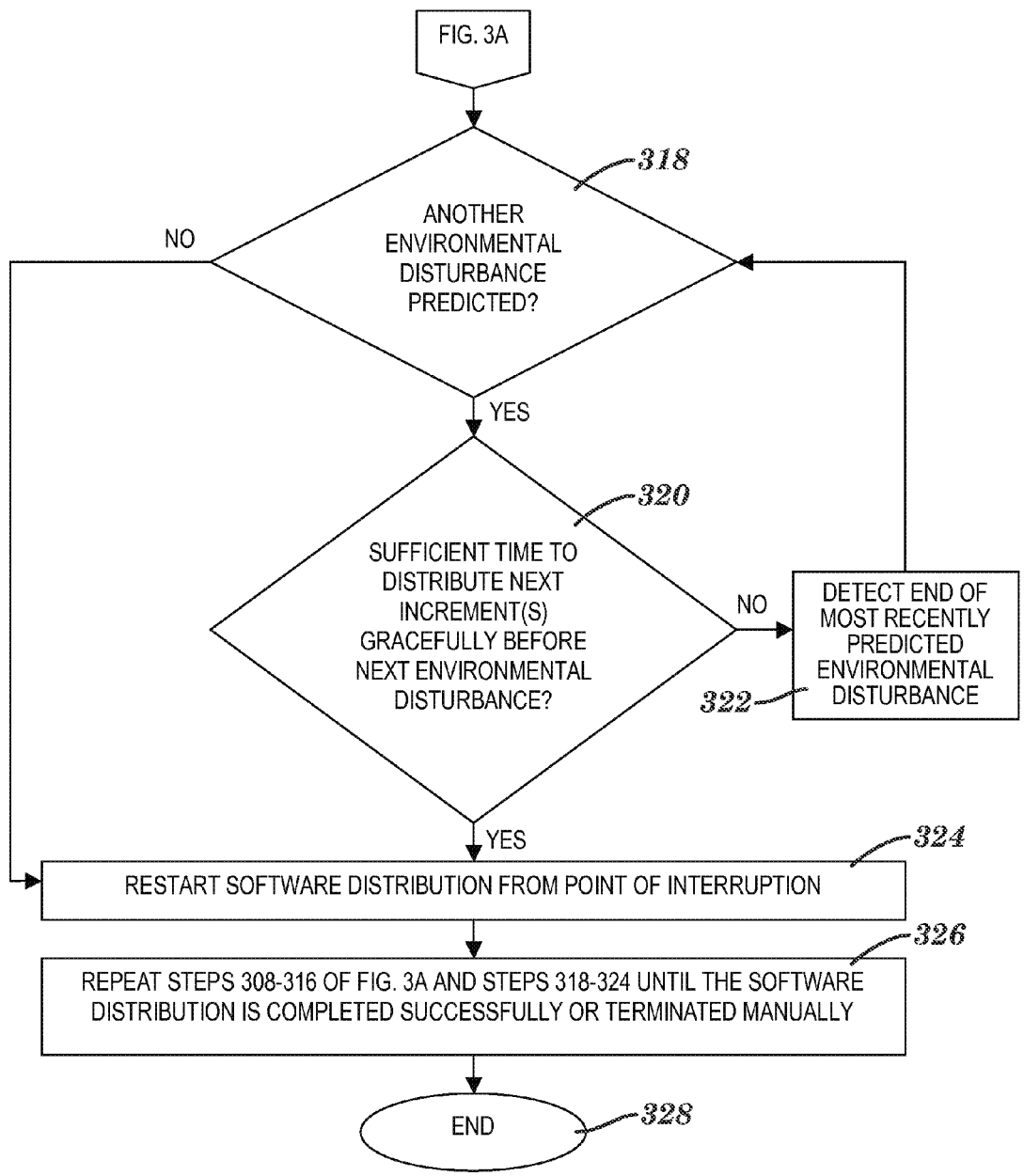

FIGS. 3A-3B depict a flow diagram of a process of controlling an in-process software distribution to computing devices via automatic checkpointing in response to a prediction of an environmental disturbance to which the computing devices are subjected, where the process is implemented by the system of FIG. 1, in accordance with embodiments of the present invention. The process of controlling an in-process software distribution begins at step 300 of FIG. 3A. In step 302, software distribution interface 108 (see FIG. 1) receives characteristics of a software package to be distributed to software distribution computing device 102 (see FIG. 1). Interface 108 (see FIG. 1) receives the software package's characteristics in step 302 from software distribution client 110 (see FIG. 1).

In step 304, data processing engine 112 (see FIG. 1) receives rules regarding checkpointing for the software distribution. Data processing engine 112 (see FIG. 1) stores the rules received in step 304 in software distribution data repository 114 (see FIG. 1). The rules, for example, specify increments (e.g., expressed as a number of bytes) used by computing device 102 (see FIG. 1) to control a distribution of a particular software package. Step 304 also includes data processing engine 112 (see FIG. 1) receiving data 120 (see FIG. 1) from users such as an engineering team. Data 120 (see FIG. 1) includes, for example, input data listed and described in FIG. 4.

In step 306, the software distribution is initiated by, for example, master server computing system 202 (see FIG. 2). In step 308, monitor 104 (see FIG. 1) receives environmental readings 118 (see FIG. 1) for variables related to the environment of a device (e.g., buoy-like device 208 of FIG. 2) that includes computing device 102 (see FIG. 1). In step 308, monitor 104 (see FIG. 1) sends the received environmental readings 118 (see FIG. 1) to data processing engine 112 (see FIG. 1), which stores the environmental readings in repository 114 (see FIG. 1). Again, environmental readings 118 (see FIG. 1) include a measurement of pressure on a computing device (e.g., buoy-like device 208 of FIG. 2) where the pressure is exerted by an element of the device's environment (e.g., exerted by water on which the buoy-like device is floating). The environmental readings 118 (see FIG. 1) may also include measures of climate and ocean activity changes. For example, the environmental readings may include water temperature, air temperature, and ocean wave data such as wave frequency, amplitude and length.

In step 310, decision and sensitivity analysis tool 106 (see FIG. 1) predicts the starting time of an environmental disturbance (e.g., the time that a buoy-like device that includes computing device 102 of FIG. 1 will be subjected to an ocean wave having an amplitude sufficient to cause a shut down of the buoy-like device). The prediction in step 310 uses artificial intelligence and is based on the readings received and stored in step 308. For example, if computing device 102 (see FIG. 1) is included in buoy-like device 208 (see FIG. 2), then step 310 predicts the starting time of a pressure disturbance interval caused by an anticipated disruptive ocean wave. In step 310, the prediction of the starting time of a pressure disturbance interval caused by a disruptive ocean wave is provided by, for example, the tri-nested spectral wave model described in Cox, A. T., Cardone, V. J. & Resio, D. T. *Coastal Wave Prediction for Cape Canaveral, Florida, Third Conference on Coastal Atmospheric and Oceanic Prediction and Processes* (Nov. 3-5, 1999).

In step 312, decision and sensitivity analysis tool 106 (see FIG. 1) determines a checkpoint for the in-process software distribution that was initiated in step 306. The determination of the checkpoint uses artificial intelligence and is based on the length of predefined increments for the software package being distributed, the amount of time available until the time of the environmental disturbance predicted in step 310 and, optionally, an amount of time that acts as a buffer (a.k.a. buffer time). The checkpoint determined in step 312 allows for a graceful interruption of the software distribution. That is, upon a restart of the distribution following the interruption, the restarted distribution does not require a repeat of any part of the distribution that occurred prior to the interruption. Thus, the present invention advantageously prevents a restarted distribution from having to start from scratch with a distribution of the first byte of the software package, which is what would be required if an interruption occurred before all bytes of one of the predefined increments were successfully distributed. Instead, the restarted distribution of the present invention begins at the point of the interruption by distributing portions of the software package that immediately follow the portions of the software package that were distributed prior to the interruption.

The checkpoint is determined in step 312 in response to computing device 102 (see FIG. 1) determining that an amount of time remaining until the predicted disturbance is insufficient to allow a completion of the software distribution. That is, the amount of time remaining until the predicted disturbance is less than the amount of time required to complete the software distribution, or less than a sum of the amount of time required to complete the software distribution plus a predefined buffer time. The aforementioned determination of the insufficiency of the amount of time remaining until the predicted disturbance may be included in step 310 or in a step (not shown) subsequent to step 310 and prior to step 312. The amount of time required to complete the software distribution is determined by computing device 102 (see FIG. 1) and is based on the characteristics received in step 302 (e.g., the size of the software package being distributed and the number of computing devices receiving the software distribution) and input data 120 (see FIG. 1) received in step 304 (e.g., network bandwidth available for the software distribution).

In the case of computing device 102 (see FIG. 1) being included in a buoy-like energy capture and generation device 208 (see FIG. 1), the checkpoint determination in step 312 uses artificial intelligence to determine which increment of the software distribution is able to complete gracefully prior to the pressure reaching a point at which the buoy-like device is programmed to shut down.

In one embodiment, the buffer time is determined in step 312 and subtracted from the time predicted in step 310 to generate a target time for completing a distribution of an increment of the software package. Determining the checkpoint so that an increment of the software package completes its distribution before the aforementioned target time increases the probability that the increment is completely distributed prior to a time of an actual occurrence of the environmental disturbance, which may vary from the time predicted in step 310. As the use of artificial intelligence in step 310 improves the prediction of times of subsequent environmental disturbances, the buffer time may be updated accordingly (e.g., as the predictions in step 310 become more accurate, the buffer time is decreased).

As an example in which a buffer time is not considered, consider that a software package being distributed to buoy-like devices 208 (see FIG. 2) has 100 more bytes to be distributed starting at time T. For the purposes of this example, the 100 bytes remaining to be distributed are numbered 1 through 100, inclusive. The software package has predefined increments, where each increment is 20 bytes in size. Each 20-byte increment takes 1 minute to distribute to the buoy-like devices. In this example, the next disruptive ocean wave is predicted to hit the buoy-like devices in 2.3 minutes from time T. Step 312 determines how many increments of the software package can be distributed before the predicted time of the disruptive wave (i.e., before time T+2.3 minutes). Because there is enough time to distribute the next two 20-byte increments (i.e., bytes 1 through 20 and 21 through 40) before time T+2.3 minutes, and because those two 20-byte increments will take 2 minutes to be distributed to the buoy-like devices, step 312 determines a checkpoint at time T+2 minutes.

As a modification of the preceding example in which the disruptive ocean wave is predicted to hit the buoy-like devices at time T+2.3 minutes, consider that a buffer time of 0.5 minutes has been predetermined. In this case, step 312 determines how many increments can be distributed to the buoy-like devices before a time generated by subtracting the buffer time from the predicted time of the disruptive ocean wave (i.e., before time T+2.3 minutes–0.5 minutes or time T+1.8 minutes). In this modified example, step 312 determines that only one increment (i.e., bytes 1-20) can be completely distributed before time T+1.8 minutes, and therefore determines a checkpoint at time T+1 minute.

If the environmental disturbance time predicted in step 310 does not provide for a checkpoint to be determined in step 312 that allows enough time to distribute at least one predefined increment of the software package being distributed, then system 100 (see FIG. 1) waits until the environmental disturbance occurs, waits for the environmental readings 118 (see FIG. 1) to return to normal (i.e., indicating that the environmental disturbance is no longer occurring) and then repeats the checkpointing process of FIG. 3A beginning at step 310 with a prediction of a time of the next environmental disturbance.

In step 314, decision and sensitivity analysis tool 106 (see FIG. 1) sends an interruption request via software distribution interface 108 (see FIG. 1) to interrupt the software distribution at the checkpoint determined in step 312. In response to the aforementioned interruption request, the software distribution is interrupted at the checkpoint determined in step 312.

In step 316, monitor 104 (see FIG. 1) obtains environmental readings 118 (see FIG. 1) that indicate that the environmental disturbance predicted in step 310 has occurred and has ended. The software distribution control process continues with the steps of FIG. 3B.

In step 318 of FIG. 3B, decision and sensitivity analysis tool 106 (see FIG. 1) uses the same technique described in step 310 (see FIG. 3A) to determine if another environmental disturbance is predicted starting at a time that precedes the anticipated completion time of the software distribution that was initiated in step 306 (see FIG. 3A).

If step 318 determines that another environmental disturbance is predicted (i.e., the process follows the Yes branch of step 318), then in step 320, decision and sensitivity analysis tool 106 (see FIG. 1) determines whether there is a sufficient amount of time to gracefully complete the distribution of one or more of the next increments of the software package prior to the time of the next environmental disturbance predicted in step 318.

If step 320 determines that there is not a sufficient amount of time to distribute one or more of the next increments of the software package gracefully before the next environmental disturbance (i.e., the process follows the No branch of step 320), then monitor 104 (see FIG. 1) obtains environmental readings 118 (see FIG. 1) that indicate that the environmental disturbance predicted in step 318 has occurred and has ended, and the process of FIG. 3B repeats starting at step 318 with a prediction of the time of the next environmental disturbance.

If step 320 determines that there is a sufficient amount of time to distribute one or more of the next increments of the software package gracefully before the next environmental disturbance (i.e., the process follows the Yes branch of step 320), then in step 324 decision and sensitivity analysis tool 106 (see FIG. 1) sends a resume request via software distribution interface 108 (see FIG. 1) to restart the software distribution that was interrupted in step 314 (see FIG. 3A). In response to the resume request, the software distribution is gracefully restarted in step 324 from the point of the interruption so that the distribution does not need to repeat a distribution of any portion of the software package that was distributed during the software distribution that occurred prior to the interruption of step 314 (see FIG. 3A).

The restart of the software distribution in step 324 is also performed if no environmental disturbance is predicted in step 318 to occur before the anticipated completion time of the software distribution initiated in step 306 (see FIG. 3A) (i.e., step 324 follows the No branch of step 318).

In step 326, the software distribution control process of FIGS. 3A-3B repeats steps 308 (see FIG. 3A) through step 324 until the software distribution initiated in step 306 (see FIG. 3A) is either completed successfully or terminated manually. In one embodiment, the present invention provides software distribution reports describing the status of completed or in-process software distributions. The software distribution control process ends at step 328.

4 Software Distributing Data Repository

FIG. 4 is a table describing examples of data stored in a database included in the system of FIG. 1, in accordance with embodiments of the present invention. Examples of data and facts stored in repository 114 (see FIG. 1) are listed and described in table 400. Users such as an engineering team may input data 120 (see FIG. 1) that includes, for example, the pressure threshold level, likelihood threshold, and/or a set of historical data (e.g., historical ocean wave amplitudes, frequencies and lengths) relative to an area local to computing device 102 (see FIG. 1) (e.g., buoy-like device 208 of FIG. 2). The pressure threshold (i.e., P in table 400) is the threshold level of pressure exerted, for example, by water on buoy-like device 208 (see FIG. 2). Detecting a pressure on buoy-like device 208 (see FIG. 2) that exceeds P causes the buoy-like device to shut down in order to protect itself. The likelihood threshold (i.e., N in table 400) is a threshold measure of the probability of an environmental disturbance occurring (e.g., a disruptive ocean wave hitting the buoy-like device). If a probability measure for the environmental disturbance exceeds N, then the environmental disturbance is anticipated in the software distribution control process of FIGS. 3A-3B. In other words, an environmental disturbance being anticipated according to the likelihood threshold indicates that the software distribution control process of FIGS. 3A-3B makes the prediction in step 310 (see FIG. 3A) or that the software distribution control process predicts another environmental disturbance in step 318 (see FIG. 3B).

Figure 5:
FIG. 5 is an example of a pressure-related function stored in a database included in the system of FIG. 1, in accordance with embodiments of the present invention.
Figure 6:
FIG. 6 is an example of an increment-related function stored in a database included in the system of FIG. 1, in accordance with embodiments of the present invention.

The water pressure exerted on buoy-like device 208 (see FIG. 2) is included in either an operational pressure range (i.e., a range in which the buoy-like device remains operational) or a warning pressure range (i.e., a range in which the buoy-like device shuts down). The operational and warning pressure ranges are dynamic based on the condition of the ocean wave. The artificial intelligence of the software distribution control process of FIGS. 3A-3B utilizes the functions in FIGS. 5 and 6 to determine if and when the software distribution and upgrade will stop. Function 500 in FIG. 5 is evaluated to determine the anticipated amount of time for the current pressure on the buoy-like device to reach the top of the operational pressure range. Function 500 is evaluated in step 310 (see FIG. 3A) to predict the time of an environmental disturbance where the predicted time is prior to the anticipated completion time of the software distribution. Function 600 in FIG. 6 is evaluated to determine the amount of time to complete the software distribution to the end of its next increment. Function 600 is evaluated in step 312 (see FIG. 3A) to determine the checkpoint for the software distribution so that the distribution can be interrupted gracefully.

5 Computing System

Figure 7:
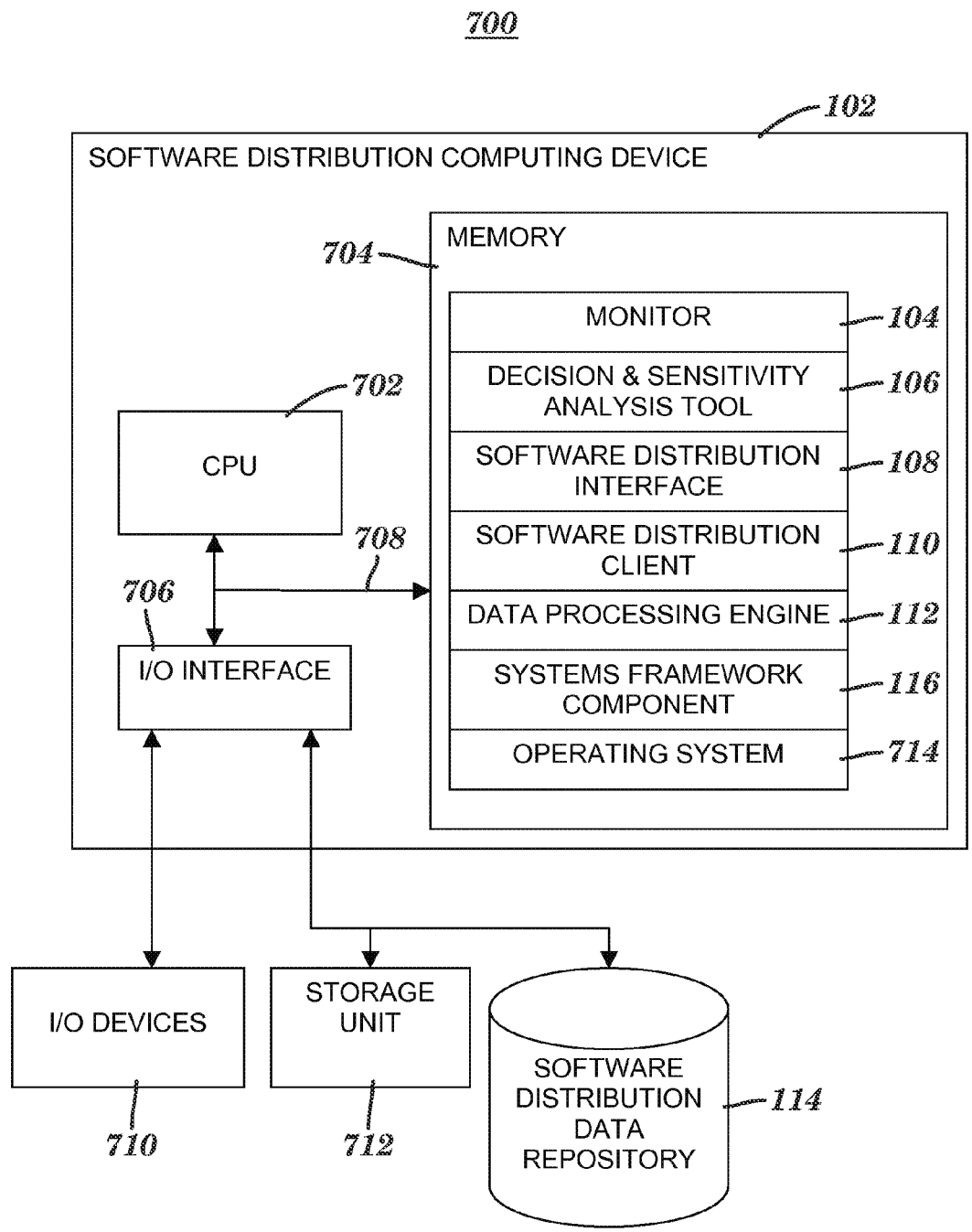
FIG. 7 is a block diagram of a computing system that includes a computing device of the system of FIG. 1 and implements the process of FIGS. 3A-3B, in accordance with embodiments of the present invention.

FIG. 7 is a block diagram of a computing system 700 that includes a computing unit 102 that is included in the system of FIG. 1 and implements the process of FIGS. 3A-3B, in accordance with embodiments of the present invention. Computing unit 102 generally comprises a central processing unit (CPU) 702, a memory 704, an input/output (I/O) interface 706, and a bus 708. Computing system 700 includes I/O devices 710, a storage unit 712 and software distribution data repository 114 coupled to computing unit 102. In another embodiment, repository 114 is included in storage unit 712. CPU 702 performs computation and control functions of computing unit 102. CPU 702 may comprise a single processing unit, or be distributed across one or more processing units in one or more locations (e.g., on a client and server).

Memory 704 may comprise any known type of data storage media, including bulk storage, magnetic media, optical media, random access memory (RAM), read-only memory (ROM), a data cache, a data object, etc. Cache memory elements of memory 704 provide temporary storage of at least some program code in order to reduce the number of times code must be retrieved from bulk storage during execution. Storage unit 712 is, for example, a magnetic disk drive or an optical disk drive that stores data. Moreover, similar to CPU 702, memory 704 may reside at a single physical location, comprising one or more types of data storage, or be distributed across a plurality of physical systems in various forms. Further, memory 704 can include data distributed across, for example, a LAN, WAN or storage area network (SAN) (not shown).

I/O interface 706 comprises any system for exchanging information to or from an external source. I/O devices 710 comprise any known type of external device, including a display monitor, keyboard, mouse, printer, speakers, handheld device, printer, facsimile, etc. Bus 708 provides a communication link between each of the components in computing unit 102, and may comprise any type of transmission link, including electrical, optical, wireless, etc.

I/O interface 706 also allows computing unit 102 to store and retrieve information (e.g., program instructions or data) from an auxiliary storage device (e.g., storage unit 712). The auxiliary storage device may be a non-volatile storage device (e.g., a CD-ROM drive which receives a CD-ROM disk). Computing unit 102 can store and retrieve information from other auxiliary storage devices (not shown), which can include a direct access storage device (DASD) (e.g., hard disk or floppy diskette), a magneto-optical disk drive, a tape drive, or a wireless communication device.

Memory 704 includes program code for the software distribution control process disclosed herein, including monitor component 104, decision and sensitivity analysis tool 106, software distribution interface 108, software distribution client 110, data processing engine 112, and systems framework component 116. Further, memory 704 includes an operating system 714 (e.g., Linux) that runs on CPU 702 and provides control of various components within and/or connected to computing unit 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 104, 106, 108, 110, 112, 116 and 714 for use by or in connection with a computing system 700 or any instruction execution system to provide and facilitate the capabilities of the present invention. For the purposes of this description, a computer-usable or computer-readable medium can be any apparatus that can store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, RAM 704, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of controlling an in-process software distribution to computing devices via automatic checkpointing in response to a prediction of an environmental disturbance to which the computing devices are subjected. Thus, the present invention discloses a process for supporting computer infrastructure, comprising integrating, hosting, maintaining and deploying computer-readable code into a computing system (e.g., computing system 700), wherein the code in combination with the computing unit is capable of performing a method of controlling an in-process software distribution to computing devices via automatic checkpointing in response to a prediction of an environmental disturbance to which the computing devices are subjected.

In another embodiment, the invention provides a business method that performs the process steps of the invention on a subscription, advertising and/or fee basis. That is, a service provider, such as a Solution Integrator, can offer to create, maintain, support, etc. a method of controlling an in-process software distribution to computing devices via automatic checkpointing in response to a prediction of an environmental disturbance to which the computing devices are subjected. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of controlling an in-process software distribution to computing devices, said method comprising:

based on a change in a pressure adjacent to a computing device, said computing device predicting a time of a disturbance in an environment of said computing device;

said computing device automatically determining a checkpoint in a time interval during which a distribution of a plurality of increments of a software upgrade is planned to be received by said computing device to upgrade said computing device, wherein said checkpoint is prior to said predicted time of said disturbance, and wherein said automatically determining said checkpoint determines said checkpoint based on a length of at least one increment of said plurality of increments of said software upgrade;

prior to said checkpoint and prior to a completion of said distribution of said plurality of increments of said software upgrade, said computing device receiving said at least one increment via said distribution; and said computing device requesting an interruption of said distribution to begin at said checkpoint.

2. The method of claim 1, further comprising:

subsequent to said interruption beginning at said checkpoint and prior to a restart of said distribution of said plurality of increments of said software upgrade after said interruption, said computing device detecting an end of said disturbance;

subsequent to said detecting said end of said disturbance, said computing device determining an amount of time before a next disturbance of said environment;

said computing device determining an amount of time required for said computing device to receive via said distribution a next increment of said plurality of increments wherein said amount of time before said next disturbance is more than said amount of time required for said computing device to receive said next increment, and wherein said next increment is different from any increment of said at least one increment received by said computing device and different from any other increment of said plurality of increments received by said computing device prior to said checkpoint and via said distribution;

subsequent to said determining said amount of time before said next disturbance, said computing device requesting said restart of said distribution of said plurality of increments of said software upgrade; and subsequent to said restart of said distribution, said computing device receiving said next increment via said distribution.

3. The method of claim 2, wherein said determining said amount of time before said next disturbance comprises evaluating a function of:

a series of readings of said pressure read by said computing device at a series of time points, a likelihood threshold indicating a probability in excess of which said disturbance is anticipated, an average time taken for said pressure to change in readings taken by each computing device of said computing devices, an average size of an increment included in said plurality of increments, an average network bandwidth available for said distribution, a pressure threshold indicating a measure of said pressure in excess of which said computing device is programmed to shut down, a series of wave amplitudes read by said computing device at said series of time points, and a series of wave lengths read by said computing device at said series of time points.

4. The method of claim 2, wherein said determining said amount of time required for said computing device to receive said next increment comprises evaluating a function of:

an average size of an increment included in said plurality of increments, an average network bandwidth available for said distribution, a number of increments included in said plurality of increments, and a plurality of sizes of a series of increments included in said plurality of increments.

5. The method of claim 2, wherein said receiving said next increment comprises receiving said next increment without repeating, subsequent to said restart, a receipt of any increment of said plurality of increments by said computing device via said distribution, and wherein said receipt of any increment occurs prior to said checkpoint.

6. The method of claim 1, wherein said computing device is a buoy-like energy capture and generation device floating in an ocean, and wherein said disturbance is an ocean wave that has an amplitude exceeding a predefined threshold and that causes a shutdown of said computing device.

7. The method of claim 6, further comprising said computing device receiving a plurality of measurements of variables associated with said environment, wherein a measurement of said plurality of measurements is selected from a group consisting of:

said pressure, wherein said pressure is exerted by a volume of water in said ocean, a temperature of said ocean substantially near said computing device, a temperature of air substantially near said computing device, a wave frequency associated with a plurality of waves of said ocean, a wave amplitude associated with a wave of said ocean, and a wave length associated with a wave of said ocean.

8. The method of claim 1, wherein said automatically determining said checkpoint comprises placing said checkpoint at a start of a predefined buffer time interval that ends at said time of said disturbance.

9. The method of claim 1, further comprising said computing device receiving a plurality of characteristics of said software upgrade, wherein a characteristic of said plurality of characteristics is selected from the group consisting of:

an average size of an increment included in said plurality of increments, an average network bandwidth available for said distribution, a number of increments included in said plurality of increments, and a plurality of sizes of a series of increments included in said plurality of increments.

10. A computer system for controlling an in-process software distribution to the computer system, the computer system comprising:

a CPU;

a computer-readable memory;

a computer-readable, tangible storage device;

first program instructions to predict, based on a change in a pressure adjacent to said computer system, a time of a disturbance in an environment of said computer system;

second program instructions to automatically determine a checkpoint in a time interval during which a distribution of a plurality of increments of a software upgrade is planned to be received by said computer system to upgrade said computer system, wherein said checkpoint is prior to said time of said disturbance predicted by said first program instructions, and wherein a determination of said checkpoint by said second program instructions is based on a length of at least one increment of said plurality of increments of said software upgrade;

third program instructions to receive, prior to said checkpoint and prior to a completion of said distribution of said plurality of increments of said software upgrade, said at least one increment; and fourth program instructions to request an interruption of said distribution to begin at said checkpoint, wherein said first, second, third and fourth program instructions are stored on said computer-readable, tangible storage device for execution by said CPU via said computer-readable memory.

11. The system of claim 10, further comprising:

fifth program instructions to detect an end of said disturbance subsequent to said interruption beginning at said checkpoint and prior to a restart of said distribution of said plurality of increments of said software upgrade after said interruption;

sixth program instructions to determine, subsequent to a detection of said end of said disturbance by said fifth program instructions, an amount of time before a next disturbance of said environment;

seventh program instructions to determine an amount of time required for said computer system to receive via said distribution a next increment of said plurality of increments wherein said amount of time before said next disturbance is more than said amount of time required for said computer system to receive said next increment, and wherein said next increment is different from any increment of said at least one increment received by said computer system by said third program instructions and different from any other increment of said plurality of increments received by said computer system prior to said checkpoint and via said distribution;

eighth program instructions to request, subsequent to a determination of said amount of time before said next disturbance by said sixth program instructions, said restart of said distribution of said plurality of increments of said software upgrade; and ninth program instructions to receive said next increment via said distribution and subsequent to said restart of said distribution, wherein said fifth, sixth, seventh, eighth and ninth program instructions are stored on said computer-readable, tangible storage device for execution by said CPU via said computer-readable memory.

12. The system of claim 11, wherein said sixth program instructions include tenth program instructions to evaluate a function of:

a series of readings of said pressure read by said computer system at a series of time points, a likelihood threshold indicating a probability in excess of which said disturbance is anticipated, an average time taken for said pressure to change in readings taken by each computer system of a plurality of computer systems that include said computer system, an average size of an increment included in said plurality of increments, an average network bandwidth available for said distribution, a pressure threshold indicating a measure of said pressure in excess of which said computer system is programmed to shut down, a series of wave amplitudes read by said computer system at said series of time points, and a series of wave lengths read by said computer system at said series of time points, wherein said tenth program instructions are stored on said computer-readable, tangible storage device for execution by said CPU via said computer-readable memory.

13. The system of claim 11, wherein said seventh program instructions include tenth program instructions to evaluate a function of:

an average size of an increment included in said plurality of increments, an average network bandwidth available for said distribution, a number of increments included in said plurality of increments, and a plurality of sizes of a series of increments included in said plurality of increments, wherein said tenth program instructions are stored on said computer-readable, tangible storage device for execution by said CPU via said computer-readable memory.

14. The system of claim 11, wherein said ninth program instructions include tenth program instructions to receive said next increment without repeating, subsequent to said restart, a receipt of any increment of said plurality of increments by said computer system via said distribution, and wherein said receipt of any increment occurs prior to said checkpoint, wherein said tenth program instructions are stored on said computer-readable, tangible storage device for execution by said CPU via said computer-readable memory.

15. A computer program product, comprising a computer-readable, tangible storage device and computer-readable program instructions stored on the computer-readable, tangible storage device to control an in-process software distribution to a computer system, the computer-readable program instructions, when executed by a CPU:

based on a change in a pressure adjacent to said computer system, predict a time of a disturbance in an environment of said computer system;

based on a length of at least one increment of said plurality of increments of said software upgrade, automatically determine a checkpoint in a time interval during which distribution of a plurality of increments of a software upgrade is planned to be received by said computer system to upgrade said computer system, wherein said checkpoint is prior to said predicted time of said disturbance;

prior to said checkpoint and prior to a completion of said distribution of said plurality of increments of said software upgrade, receive said at least one increment via said distribution; and request an interruption of said distribution to begin at said checkpoint.

16. The program product of claim 15, wherein said computer-readable program instructions, when executed by said CPU, further subsequent to said interruption beginning at said checkpoint and prior to a restart of said distribution of said plurality of increments of said software upgrade after said interruption, detect an end of said disturbance;

subsequent to a detection of said end of said disturbance by said computer-readable program instructions, determine an amount of time before a next disturbance of said environment;

determine an amount of time required for said computer system to receive via said distribution a receipt of a next increment of said plurality of increments, wherein said amount of time before said next disturbance is more than said amount of time required for said computer system to receive said next increment, and wherein said next increment is different from any increment of said at least one increment and different from any other increment of said plurality of increments received by said computer system prior to said checkpoint and via said distribution;

subsequent to a determination of said amount of time before said next disturbance by said computer-readable program instructions, request said restart of said distribution; and subsequent to said restart of said distribution, receive said next increment.

17. The program product of claim 16, wherein said computer-readable program instructions to determine said amount of time before said next disturbance comprises said computer-readable program instructions to evaluate a function of:
- a series of readings of said pressure read by said computer system at a series of time points,
- a likelihood threshold indicating a probability in excess of which said disturbance is anticipated,
- an average time taken for said pressure to change in readings taken by each computer system of a plurality of computer systems that includes said computer system,
- an average size of an increment included in said plurality of increments,
- an average network bandwidth available for said distribution,
- a pressure threshold indicating a measure of said pressure in excess of which said computer system is programmed to shut down,
- a series of wave amplitudes read by said computer system at said series of time points, and
- a series of wave lengths read by said computer system at said series of time points.

18. The program product of claim 16, wherein said computer-readable program instructions to determine said amount of time required for said computer system to receive said next increment comprises said computer-readable program instructions to evaluate a function of:
- an average size of an increment included in said plurality of increments,
- an average network bandwidth available for said distribution,
- a number of increments included in said plurality of increments, and
- a plurality of sizes of a series of increments included in said plurality of increments.

19. The program product of claim 16, wherein said computer-readable program instructions to receive said next increment comprises said computer-readable program instructions to receive said next increment without repeating, subsequent to said restart, a receipt of any increment of said plurality of increments by said computer system via said distribution, and wherein said receipt of any increment occurs prior to said checkpoint.

20. The program product of claim 15, wherein said computer system is a buoy-like energy capture and generation device floating in an ocean, and wherein said disturbance is an ocean wave that has an amplitude exceeding a predefined threshold and that causes a shutdown of said computer system.

* * * * *